US012267643B2

(12) United States Patent
Yang et al.

(10) Patent No.: US 12,267,643 B2
(45) Date of Patent: Apr. 1, 2025

(54) SPEAKER BOX

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Haijuan Yang, Shenzhen (CN); Lifeng Wu, Shenzhen (CN)

(73) Assignees: AAC Microtech (Changzhou) Co., Ltd., Changzhou (CN); AAC Acoustic Technologies (Shenzhen) Co., Ltd., Shenzhen (CN)

(*) Notice: Subject to any disclaimer, the term of this patent is extended or adjusted under 35 U.S.C. 154(b) by 265 days.

(21) Appl. No.: 17/965,838

(22) Filed: Oct. 14, 2022

(65) Prior Publication Data

US 2023/0328428 A1 Oct. 12, 2023

(30) Foreign Application Priority Data

Apr. 7, 2022 (CN) ......................... 202220797325.7

(51) Int. Cl.
*H04R 1/28* (2006.01)
*H04R 1/02* (2006.01)

(52) U.S. Cl.
CPC ............. *H04R 1/288* (2013.01); *H04R 1/025* (2013.01); *H04R 2400/11* (2013.01)

(58) Field of Classification Search
CPC ...... H04R 1/2803; H04R 1/288; H04R 1/025; H04R 2400/11; H04R 1/02; H04R 9/06; H04R 9/02; H04R 7/04; H04R 1/345; H04R 9/04; H04R 7/16; H04R 1/021; H04R 31/006; H04R 9/025; H04R 2499/11; H04R 7/12; H04R 7/20; H04R 9/045; H04R 9/043
USPC ....... 381/400, 401, 402, 403, 404, 405, 407, 381/409, 412, 345, 396, 388, 386
See application file for complete search history.

(56) References Cited

U.S. PATENT DOCUMENTS

| | | | | |
|---|---|---|---|---|
| 2016/0219372 A1* | 7/2016 | Wang | H04R 17/005 | |
| 2018/0213328 A1* | 7/2018 | Zhang | H04R 9/04 | |
| 2020/0045409 A1* | 2/2020 | Chen | H04R 1/288 | |
| 2020/0213754 A1* | 7/2020 | Wang | H04R 1/02 | |
| 2023/0328452 A1* | 10/2023 | Liu | H05K 1/189 | 381/400 |

* cited by examiner

*Primary Examiner* — Carolyn R Edwards
*Assistant Examiner* — Julie X Dang
(74) *Attorney, Agent, or Firm* — W&G Law Group

(57) ABSTRACT

The present invention provides a speaker box. The speaker box includes a housing, a speaker unit, and an air-permeable spacer assembly accommodated in the housing. The air-permeable spacer assembly includes a bracket and an air-permeable spacer fixed to the bracket. The housing includes a bottom wall and a side wall. The bracket includes an annular main body and a leg. The air-permeable spacer is attached to the annual main body. The annular main body is fixed to the side wall. The leg is fixed to the bottom wall. At the same time, the bracket can be easily and conveniently adapted to various complex shapes of the housing through the annular main body and the leg. In addition, the filling amount of the sound absorbing powder can be increased.

7 Claims, 4 Drawing Sheets

SPEAKER BOX

FIELD OF THE PRESENT DISCLOSURE

The present invention relates to the field of electro-acoustic transducers, in particular to a speaker box used in a portable electronic product.

DESCRIPTION OF RELATED ART

The speaker box of the related art includes a housing, a speaker unit accommodated in the housing, and the air-permeable spacer is enclosed with the housing to form a containment space filled with the sound absorbing powder.

However, when the housing shape is complex, the air-permeable spacer with three-dimensional structure needs to be adapted to the housing shape, which makes the three-dimensional structure of the air-permeable spacer complex and difficult to form. In addition, the air-permeable spacer is glued to the housing. In order to ensure the reliability of gluing, the glued flipped edge of the air-permeable spacer needs to reserve a certain width. This results in a waste of space, which is not conducive to increasing the filling amount of the sound absorbing powders.

Therefore, it is necessary to provide a new speaker box to solve the above technical problems.

SUMMARY OF THE PRESENT INVENTION

The present invention is to provide a speaker box that includes the air-permeable spacer assembly and can increase filling amount of the sound absorbing powder. The air-permeable spacer assembly can be easily and conveniently adapted to various complex shapes of housing. Meanwhile, an air-permeable spacer with a simple sheet structure can be used.

For achieving the object mentioned above, the invention provides a speaker box including:

a housing having a bottom wall and a side wall extending from the bottom wall;

a speaker unit accommodated in the housing;

air-permeable spacer assembly accommodated in the housing;

a containment space formed by the air-permeable spacer assembly with the housing for being filled with sound absorbing powder; wherein the air-permeable spacer assembly includes a bracket having an annular main body fixed with the side wall of the housing and a leg extending from the annular main body for connecting with the bottom wall of the housing; and an air-permeable spacer fixed to the annual main body of the bracket.

In addition, the bottom wall includes a first part and a second part that is closer to the annual main body than the first part; the leg includes a first leg fixed to the first part and a second leg fixed to the second part; a length of the first leg is greater than a length of the second leg.

In addition, the leg extends from an inner perimeter of the annular main body.

In addition, the housing further includes a top wall extending from the side wall; the top wall is opposite to the bottom wall, and the speaker unit is fixed on the top wall.

In addition, the housing includes an upper housing and a lower housing which are covered and connected to each other; the speaker unit is fixed to the upper housing, and the air-permeable spacer assembly is fixed to the lower housing.

In addition, the housing and the bracket are made of metal; the annular main body is fixed with the side wall by laser welding, and the leg is fixed with the bottom wall by laser welding.

In addition, the bottom wall includes a powder filling hole communicating with the containment space, and a sealing element sealing the powder filling hole; the powder filling hole is formed in the first part.

In addition, the first part includes a depressed part forming the powder filling hole; the sealing element is accommodated in the depressed part and not higher than a surface of the first part.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
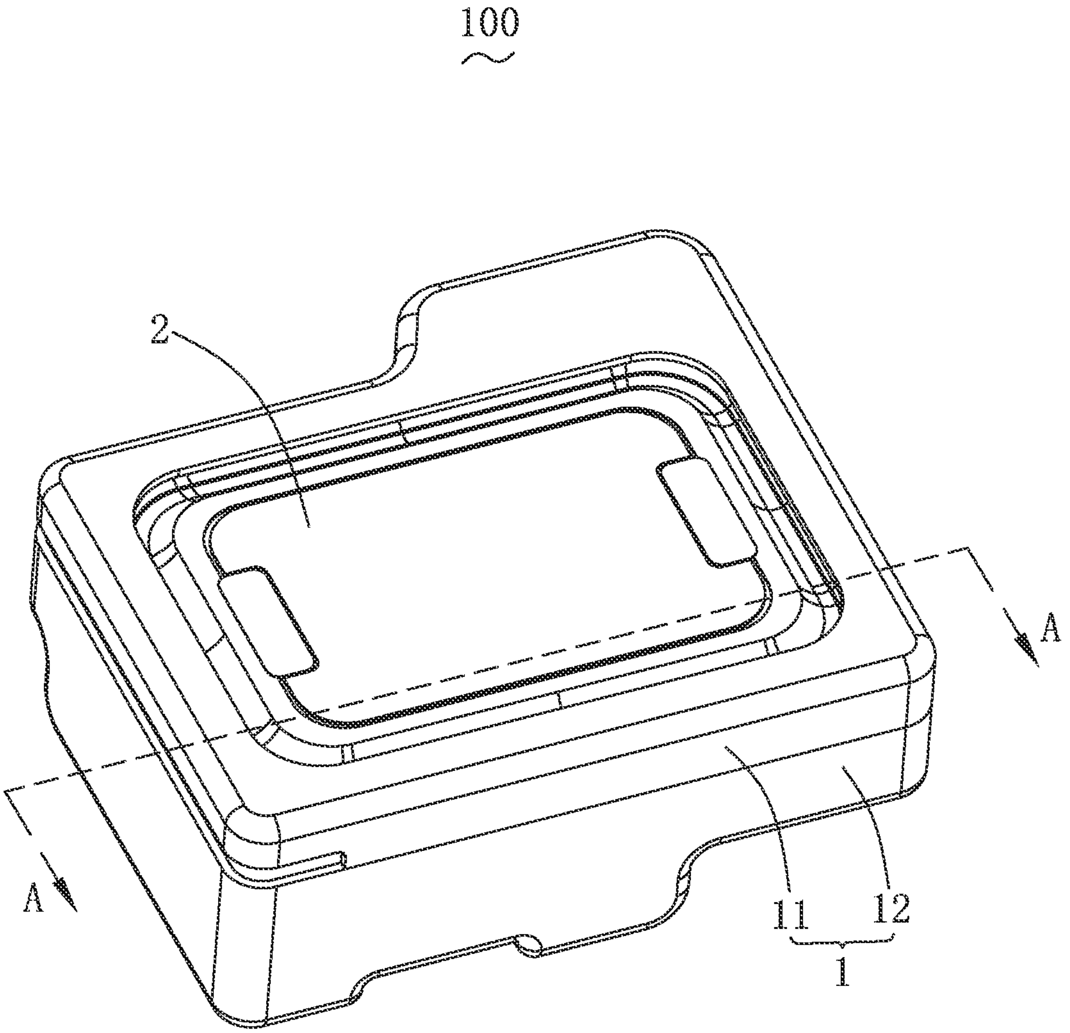
FIG. 1 is an isometric view of a speaker box in accordance with an embodiment of the present invention.
Figure 2:
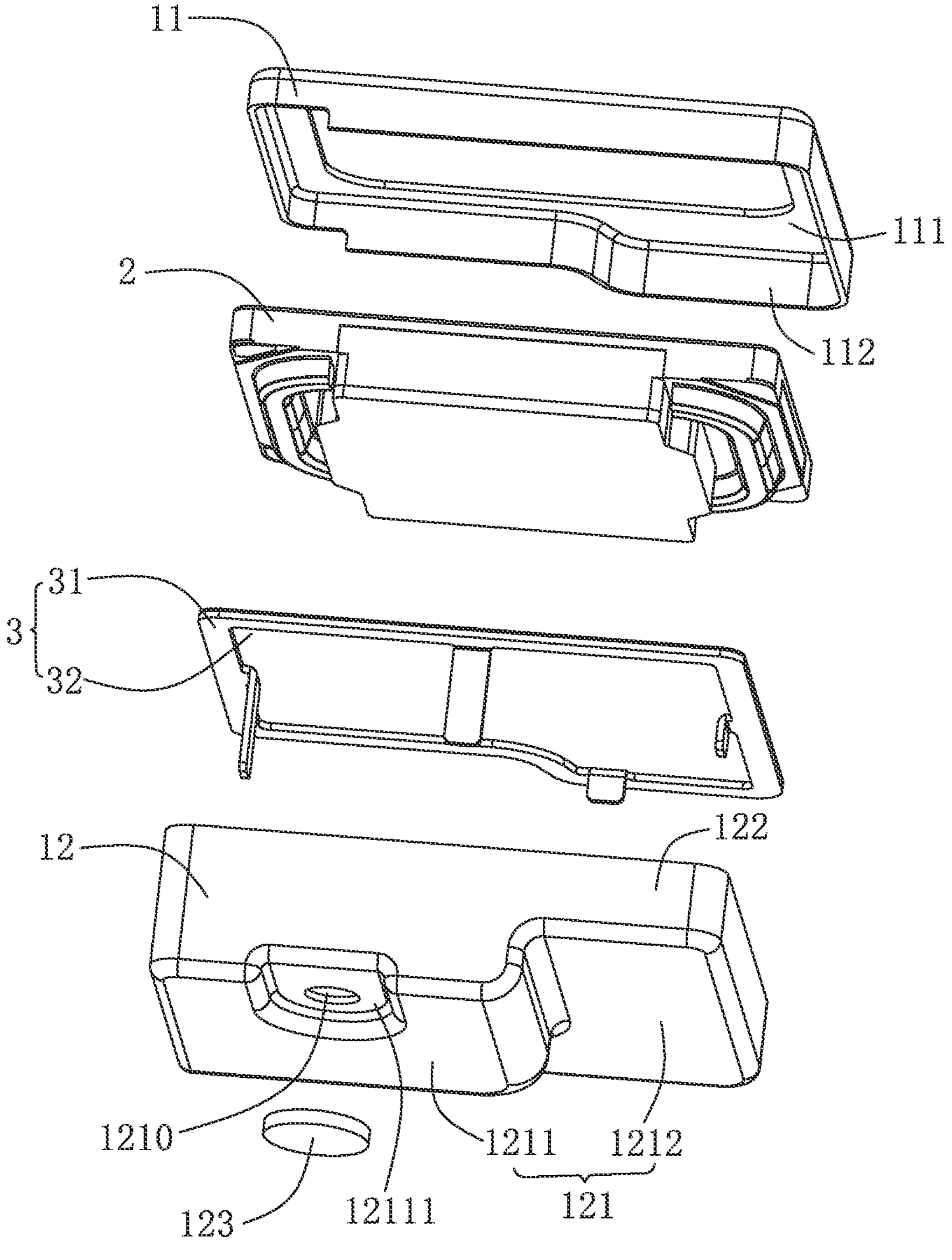
FIG. 2 is an isometric and exploded view of the speaker box shown in FIG. 1.
Figure 3:
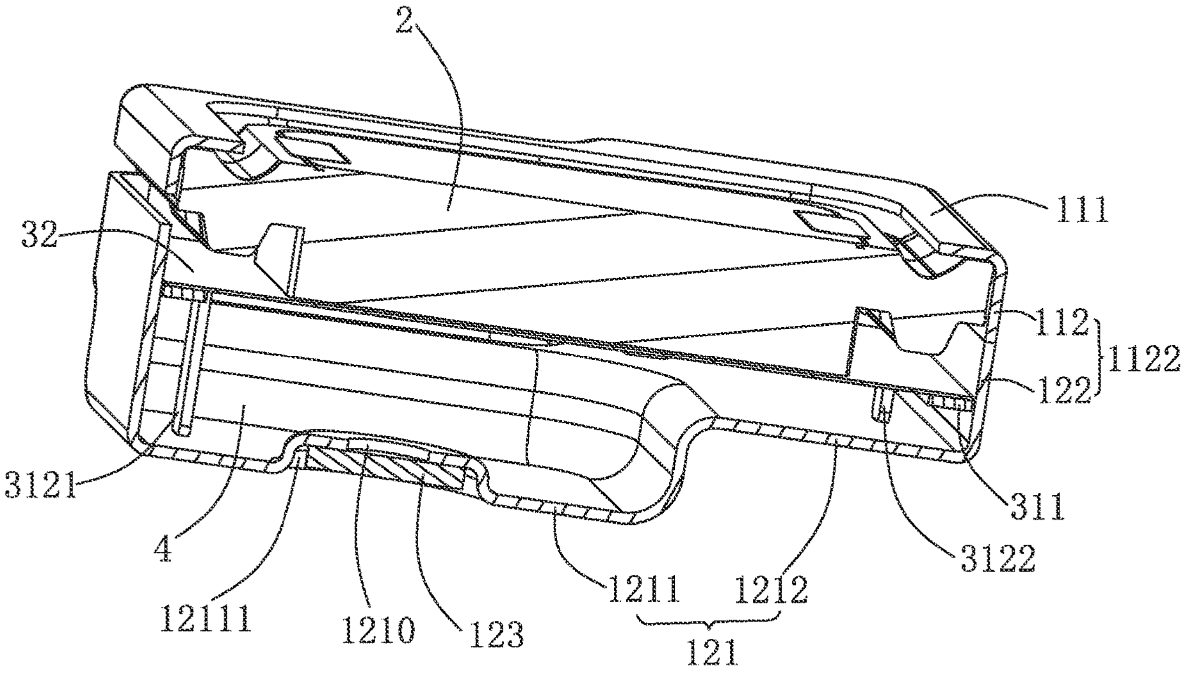
FIG. 3 is a cross-sectional view of the speaker box taken along line A-A in FIG. 1.
Figure 4:
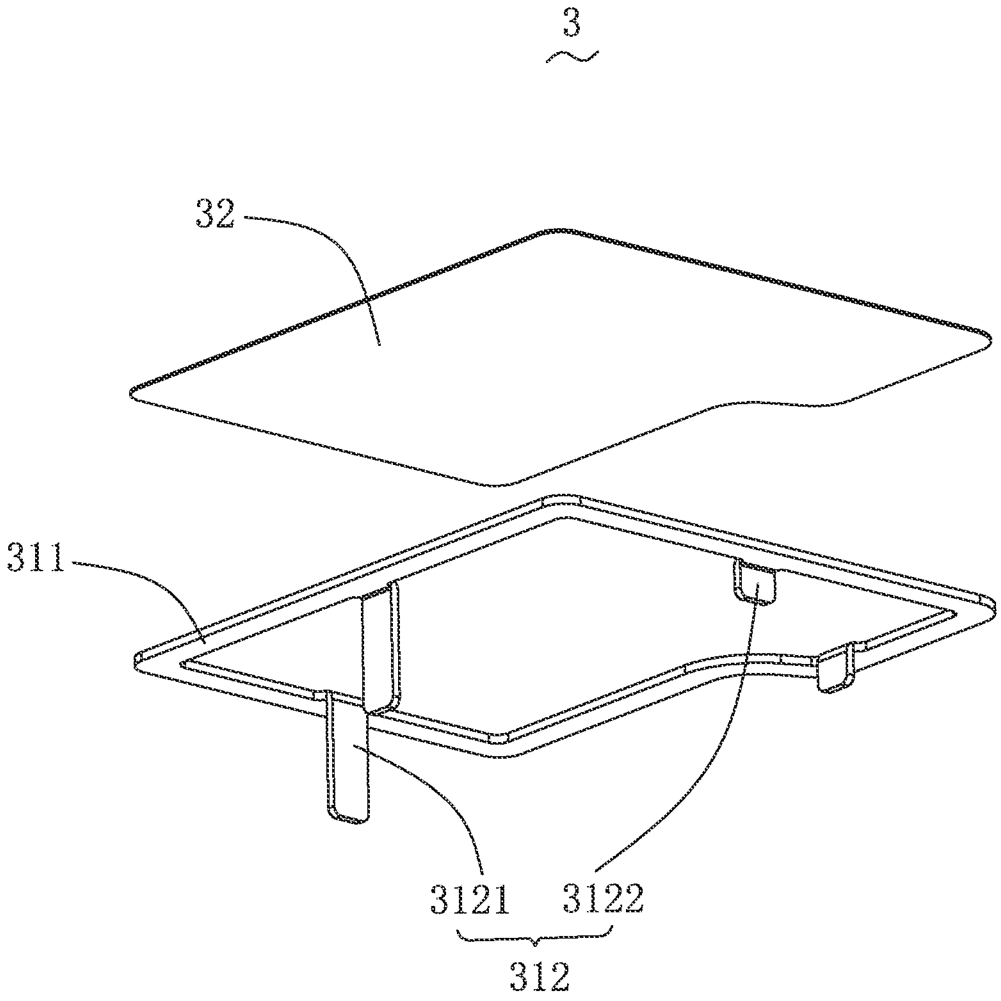
FIG. 4 is an exploded view of an air-permeable spacer assembly of the speaker box shown.

Please refer to FIGS. 1-4, the present invention provides a speaker box 100, the speaker box 100 includes a housing 1, a speaker unit 2 and an air-permeable spacer assembly 3 housed in the housing 1. The air-permeable spacer assembly 3 is enclosed with the housing 1 to form a containment space 4 filled with sound absorbing powder.

The housing 1 includes an upper housing 11 and a lower housing 12 that are covered with each other, the speaker unit 2 is fixed to the upper housing 11, and the air-permeable spacer assembly 3 is fixed to the lower housing 12. In this embodiment, the housing 1 includes a bottom wall 121, a side wall 1122 extending from the bottom wall 121, and a top wall 111 extending from the side wall 1122. The top wall 111 is disposed opposite to the bottom wall 121. The upper housing 11 includes the top wall 111 and a part 112 of the side wall 1122. The lower housing 12 includes the bottom wall 121 and another part 122 of the side wall 1122. The speaker unit 2 is fixed to the top wall 111.

The air-permeable spacer assembly 3 includes a bracket 31 and an air-permeable spacer 32 fixed to the bracket 31. The bracket 31 includes an annular main body 311 and a leg 312 extending from the inner perimeter of the annular main body 311. The air-permeable spacer 32 is attached to the annual main body 311. The annular main body 311 is fixed to the side wall 1122. The leg 312 is fixed to the bottom wall 121.

The bottom wall 121 includes a first part 1211 and a second part 1212, and the second part 1212 is closer to the annular main body 311 than the first part 1211. The leg 312 includes a first leg 3121 fixed to the first part 1211 and a second leg 3122 fixed to the second part 1212. The length of the first leg 3121 is greater than the length of the second leg 3122.

The bottom wall 121 is provided with a powder filling hole 1210 connecting with the containment space 4 and a sealing element 123 for sealing the powder filling hole 1210. In this embodiment, the powder filling hole 1210 is formed in the first part 1211. As an improved embodiment, the first part 1211 is provided with a depressed part 12111 formed by a depression. The powder filling hole 1210 is formed in the depressed part 12111. The sealing element 123 is accommodated in the depressed part 12111 and is not higher than the surface of the first part 1211.

In this embodiment, both the housing 1 and the bracket 31 are made of metal. The annular main body 311 is fixed with the side wall 1122 by laser welding. The leg 312 is fixed with the bottom wall 121 by laser welding.

The air-permeable spacer assembly of the speaker box of the present invention includes a bracket and an air-permeable spacer fixed to the bracket. The bracket includes an annular main body and a leg extending from the annular main body. The air-permeable spacer is attached to the annual main body. The annular main body is fixed to the side wall. The leg is fixed on the bottom wall. Therefore, the air-permeable spacer can adopt a simple sheet structure. At the same time, the bracket can easily and conveniently adapt to various complex shapes of housing through the annular main body and the leg. The containment space filled with sound absorbing powder can be fully extended to the housing, which increases the filling amount of the sound absorbing powder.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box including:
- a housing having a bottom wall and a side wall extending from the bottom wall;
- a speaker accommodated in the housing;
- an air-permeable spacer assembly accommodated in the housing;
- a containment space formed by the air-permeable spacer assembly with the housing for being filled with sound absorbing powder; wherein
- the air-permeable spacer assembly includes
- a bracket having an annular main body fixed with the side wall of the housing and a leg extending from the annular main body for connecting with the bottom wall of the housing; and
- an air-permeable spacer fixed to the annual main body of the bracket, wherein
- the bottom wall includes a first part and a second part that is closer to the annual main body than the first part; the leg includes a first leg fixed to the first part and a second leg fixed to the second part; a length of the first leg is greater than a length of the second leg.

2. The speaker box as described in claim 1, wherein the leg extends from an inner perimeter of the annular main body.

3. The speaker box as described in claim 1, wherein the housing further includes a top wall extending from the side wall; the top wall is opposite to the bottom wall, and the speaker is fixed on the top wall.

4. The speaker box as described in claim 1, wherein the housing includes an upper housing and a lower housing which are covered and connected to each other; the speaker is fixed to the upper housing, and the air-permeable spacer assembly is fixed to the lower housing.

5. The speaker box as described in claim 1, wherein, the housing and the bracket are made of metal; the annular main body is fixed with the side wall by laser welding, and the leg is fixed with the bottom wall by laser welding.

6. The speaker box as described in claim 1, wherein the bottom wall includes a powder filling hole communicating with the containment space, and a sealing element sealing the powder filling hole; the powder filling hole is formed in the first part.

7. The speaker box as described in claim 6, wherein the first part includes a depressed part forming the powder filling hole; the sealing element is accommodated in the depressed part and not higher than a surface of the first part.

* * * * *